United States Patent
Engel et al.

(10) Patent No.: US 7,130,896 B2
(45) Date of Patent: Oct. 31, 2006

(54) METHOD AND SYSTEM FOR REMOTE SOFTWARE DISTRIBUTION AND INSTALLATION

(75) Inventors: Gerhard Engel, Herrenberg (DE); Uwe Heinrich, Deidesheim (DE)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/028,225

(22) Filed: Dec. 18, 2001

(65) Prior Publication Data

US 2002/0078186 A1 Jun. 20, 2002

(30) Foreign Application Priority Data

Dec. 20, 2000 (EP) .................................. 00128018

(51) Int. Cl.
G06F 15/177 (2006.01)
G06F 15/173 (2006.01)
G06F 9/44 (2006.01)
H04L 12/56 (2006.01)

(52) U.S. Cl. .................. 709/220; 709/223; 717/172

(58) Field of Classification Search ............... 709/217, 709/220–223; 717/171, 172, 173, 174
See application file for complete search history.

(56) References Cited

U.S. PATENT DOCUMENTS

| 5,845,090 | A | * | 12/1998 | Collins et al. ............... 709/221 |
| 6,009,274 | A | * | 12/1999 | Fletcher et al. .............. 709/217 |
| 6,049,671 | A | * | 4/2000 | Slivka et al. ................. 717/173 |
| 6,049,892 | A | | 4/2000 | Casagrande et al. |
| 6,070,184 | A | | 5/2000 | Blount et al. |
| 6,259,442 | B1 | * | 7/2001 | Britt et al. .................... 715/721 |
| 6,289,511 | B1 | * | 9/2001 | Hubinette ..................... 709/223 |
| 6,351,761 | B1 | * | 2/2002 | Cantone et al. .............. 709/202 |
| 6,473,099 | B1 | * | 10/2002 | Goldman et al. ............ 709/217 |
| 6,557,054 | B1 | * | 4/2003 | Reisman ....................... 709/206 |
| 6,640,238 | B1 | * | 10/2003 | Bowman-Amuah ......... 709/201 |
| 6,966,060 | B1 | * | 11/2005 | Young et al. ................. 717/177 |
| 2002/0100036 | A1 | * | 7/2002 | Moshir et al. ............... 709/221 |

FOREIGN PATENT DOCUMENTS

JP 09-160858 6/1997

(Continued)

OTHER PUBLICATIONS

Copy of International Search Report for PCT/EP01/14326.

*Primary Examiner*—Khanh Dinh
*Assistant Examiner*—Hassan Phillips
(74) *Attorney, Agent, or Firm*—Myers Bigel Sibley & Sajovec

(57) ABSTRACT

A mechanism for the remote distribution/installation of computer programs from a source to a number of target computers. The computer programs are transferred as packages identified in a package list. Attempt numbers for retrying a push mode and a pull mode distribution are pre-specified. A next package is identified in the package list and it is checked if a target computer is available. If it is available then installation of the package on the target computer is started. Otherwise, if at least one push mode attempt is left, a next push mode is resumed and rescheduled and, if no push mode attempt is left, but at least one pull mode attempt is left, a next pull mode distribution is resumed and rescheduled. The mechanism particularly proposes a queue manager that activates a request, i.e., moves the request from a request queue into an active queue, and has implemented throttling that balances the load during a software distribution/installation.

12 Claims, 4 Drawing Sheets

FOREIGN PATENT DOCUMENTS

| | | |
|---|---|---|
| JP | 2000-106559 | 4/2000 |
| JP | 2000-293452 | 10/2000 |

\* cited by examiner

METHOD AND SYSTEM FOR REMOTE SOFTWARE DISTRIBUTION AND INSTALLATION

RELATED APPLICATIONS

The present application is a 35 U.S.C. § 371 national phase application of PCT International Application No. PCT/EP01/14325, having an international filing date of Dec. 6, 2001, and claiming priority to European Patent Application No. 00128018.9, filed Dec. 20, 2000, the disclosures of which are incorporated herein by reference in their entireties. The above PCT International Application was published in the English language and has International Publication No. WO 02/50660.

BACKGROUND OF THE INVENTION

The present invention generally relates to the field of software distribution in a digital computer network and, more specifically, to a method and system for remote distribution and installation of digital computer programs from a source data processing system to at least one target data processing system, wherein the computer programs, in particular, are transferred as packages that are specified in a package list.

A method and system for the distribution of software and data in a digital computer network is disclosed in U.S. Pat. No. 5,845,090. The software and data are combined into single entities referred to as "packages". Software packages are stored in a central package archive and a transfer program accesses the central package archive to schedule transfers of one or more software packages. The transfer program enables a user to specify, besides other attributes, the date and time for the transmission and the installation of the packages. Once a software package is scheduled for transmission to a target computer, an indication is stored in an outbound package queue. A package transfer agent program acts on this indication and transfers the package from the central package archive to the target system. A corresponding package transfer agent on the target system places packages in an inbound package queue. Finally a transfer daemon determines the package type and acts accordingly. If the package type is 'Distribution', then it messages the package to start installation.

Further, known software distribution/installation approaches like the IBM Tivoli Software Distribution product have in general two concepts for bringing software from a software repository to a particular target computer system. These concepts are called 'Push'-Mode and 'Pull'-Mode distribution.

A Push-Mode distribution is initiated by an operator or an automated process from a central point, aiming to force a software installation on all reachable target systems of a desired range. The Push-Mode distribution has disadvantages in large computer environments, especially environments spread over several continents, where the number of reachable target systems may be rather small. This is due to the fact that a standard end-user workstation may be online less then twelve hours a day and there is a lot of planning overhead to make sure a set of targets is online, at the very time the distribution will take place. Time zones, working hours and holidays have to be considered, and often, a software installation is not welcome during office hours. The last fact is not really a problem for server systems, which are generally up 24 hours a day but again for end-user systems, where either the users have to be forced to leave their machines up after work or to wake the systems up by hardware features such as Wake-On-LAN, which may not be available for all target systems in scope.

In contrast to the aforedescribed Push-Mode distribution, a Pull-Mode distribution is initated by a user of a target computer system or the target system itself. The activation of the installation may be initiated in a quiet mode, i.e. automatically during a system or user logon, without user attendence, or by a user interface giving a list of available packages to select from for installation.

The Pull-Mode distribution technique has the advantage over the predescribed Push-Mode technique that the target system is already online when the distribution is started.

But the drawback of the PULL-Mode distribution is that an exact time for the distribution/installation can not be determined in advance. This may result in target systems which are not updated in time since it is not forseeable at which time a login of the target system is performed.

In addition, a peak load in the distribution and network environment on the side of the source system, e.g. when a large number of users is logging into their systems, will cause time delays for starting a distribution/installation or cause a decrease in the overall throughput and thus will drop distribution/installation performance.

SUMMARY OF THE INVENTION

It is therefore an object of the present invention to provide an improved method and system for the remote distribution/installation of computer programs.

It is another object to allow for an automized distribution/installation of computer programs on a multitude of remote computer systems.

These objects are achieved by the features of the independent claims. Advantageous embodiments are the subject matter of the subclaims.

The concept underlying the invention is to choose a particular distribution mode, depending on the availability of an envisaged target computer system, before attempting to distribute a package. If the target system is not available, an automatic mode switching is performed which embraces automatically switching to an aforedescribed PULL- or PUSH-mode. If the target system can be reached, the proposed distribution process runs through a package list step by step, installing one package after the other.

The invention particularly proposes a built-in queueing mechanism which enables the distribution process to wait for non-reachable target systems to wake up. In this case, the distribution resumes and reschedules a next PULL or PUSH operation. If even the rescheduling does not succeed, the proposed mechanism switches over to an authoritative PULL-mode where the respective target system(s) is (are) forced into PULL-mode distribution, a so-called "authoritative PULL-mode".

BRIEF DESCRIPTION OF THE DRAWINGS

The invention will now be described in the following in more detail by way of a preferred embodiment from which further features and advantages will become evident, whereby reference is made to the accompanying drawings. In the drawings, similar or functional identical features are referenced with identical reference signs.

DETAILED DESCRIPTION OF A PREFERRED EMBODIMENT

Figure 1:
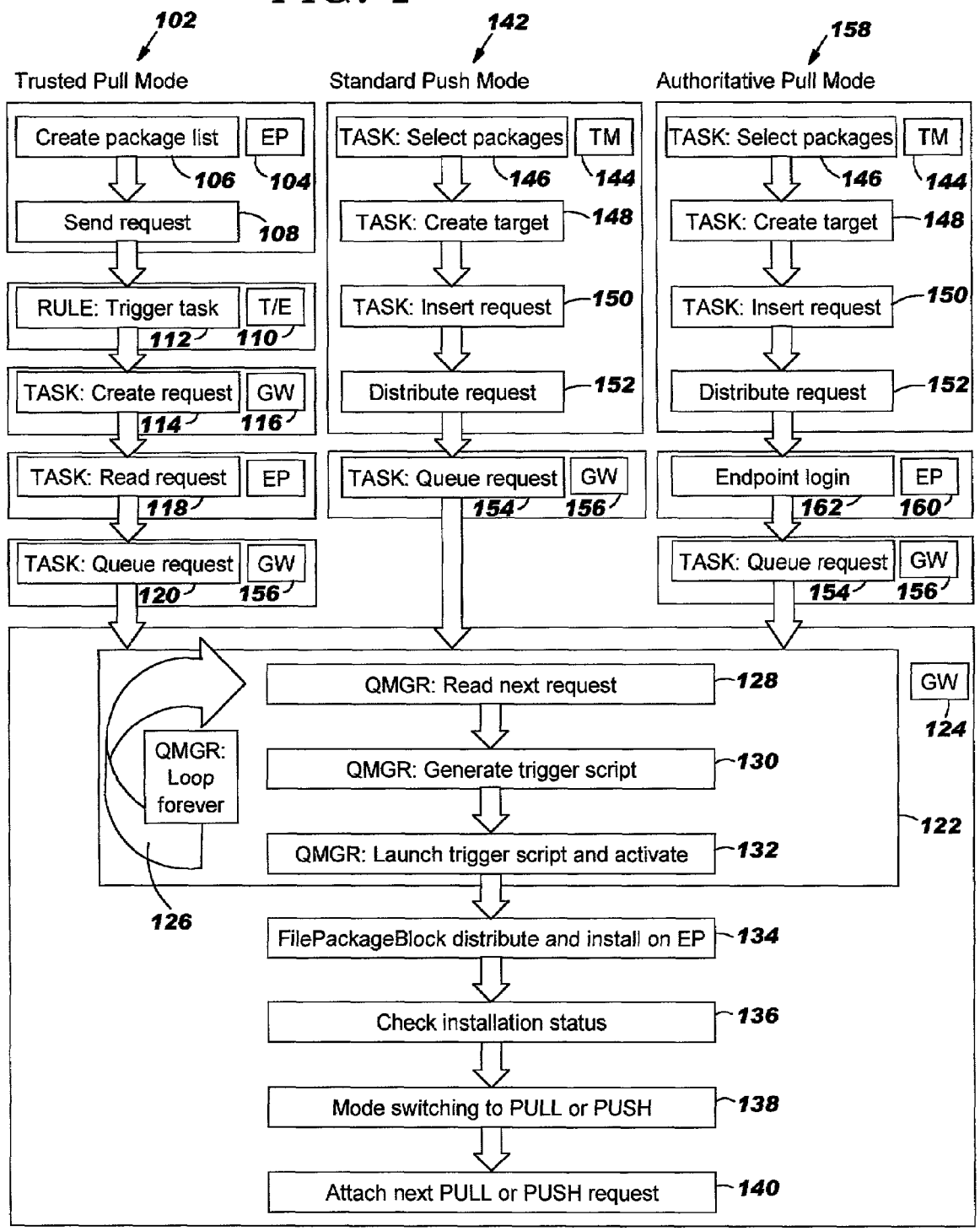
FIG. 1 is an overview of the different software distribution (SWD) modes in accordance with the invention, by way of a flow diagram.

The proposed software distribution (SWD) mechanism runs through a series of different processes located on different systems. As shown in FIG. 1, there are three distribution modes underlying to the mechanism:

Trusted Pull Mode (Initial Pull),
Standard Push Mode,
Authoritative Pull Mode, wherein the 'Trusted Pull Mode' and the 'Authoritative Pull Mode' both are regarded as novel vis-à-vis the prior art.

In FIG. 1, for every process the corresponding hosting system is shown as a background frame.

In the Trusted Pull Mode process 102, an Endpoint (EP) 104, i.e. a target computer system for a distribution/installation of software (SW), provides 106 a list of requested packages. In a next step, the EP sends 108 a request for the SW distribution/installation to a Tivoli Enterprise Console server (T/E) 110. The T/E 110 triggers 112 a script which initiates two tasks 114, 118, one calling the other. The first task 114 'Create SWD Request' is launched on a gateway (GW) 116, i.e. in the present embodiment a local source code server. The second task 118 'Insert SWD request from EP' reads the contents of the package list on the target system and creates 120 a request file in a request queue directory.

In the following, the SWD request 120 will be handled by a Queue Manager (QMGR) 122 located on the GW 124. The QMGR 122 executes a loop 126 in which the first step is to read a next request 128 stored in the request queue directory. As a next step, the QMGR 122 generates a trigger script 130 and finally it launches the generated trigger script and activates the request 132 by moving the request from the request into an active queue. The beforehand described loop is executed continuously until all requests stored in the request queue are worked off.

For each launched trigger script and activated request, a FilePackageBlock is distributed/installed 134 on the EP. During installation, the installation status is checked 136 for each transferred and installed package, and dependent on the results of that check, according to the invention, a mode switching to the PULL- or PUSH-Mode initiated 138. These distribution modes will be discussed in more detail below. After a mode switching should have been occurred, the next PULL or PUSH request will be attached in the queue 140 (see also FIG. 2).

In case of the Standard Push Mode 142, the SW distribution process starts on a Tivoli Management Framework server (TM) 144. At first, a task running on the TM 144 selects SW packages 146 for the distribution/installation and creates a target list 148 for the different Endpoints or target computers for which the packages are determined. Thereafter the TM 144 inserts 150 and distributes 152 an according request and transfers the request to an above described request queue 154 located on a GW 156, which is further processed by the QMGR 122 described beforehand.

Further, in case of the Authoritative Pull Mode 158, the first four steps 'selecting packages' to 'distributing a request' 146–152 are identical with the corresponding first four steps in the Standard Push Mode 142 and thus are not described again. But in contrast to the Standard Push Mode 142, the request is directly sent from the EP 160 wherein an 'authoritative' EP login 162 is performed. As in the other distribution modes, the request is then put in a request queue 154 located on the GW 156, which is further processed by a QMGR 122 as described beforehand.

The three modes 102, 142, 158 therefore differ in the way of inserting a new distribution request into the request queue. The main distribution process is controlled by a central script, the above described QMGR, which is responsible to monitor a special directory called the predescribed 'request queue' for SWD request files and to activate them by launching the main distribution script once for each request. Additionally, it monitors the number of concurrently active distributions providing a simple throttling mechanism to prevent the system from overload.

The key feature of the proposed distribution mechanism is a main distribution script that selects a particular distribution mode determined by an Endpoint (EP) availability, before attempting to distribute a package. If the EP is not available, an automatic mode switching handles this situation by means of an automatic switching to the PULL- or PUSH-mode, an automatic re-scheduling, a wake-on LAN, an automatic resume, or an aborting. If the EP can be reached, the main distribution script runs through a package list step by step, installing one package after the other. The progress of these installation steps can be monitored on the T/E.

Figure 2:
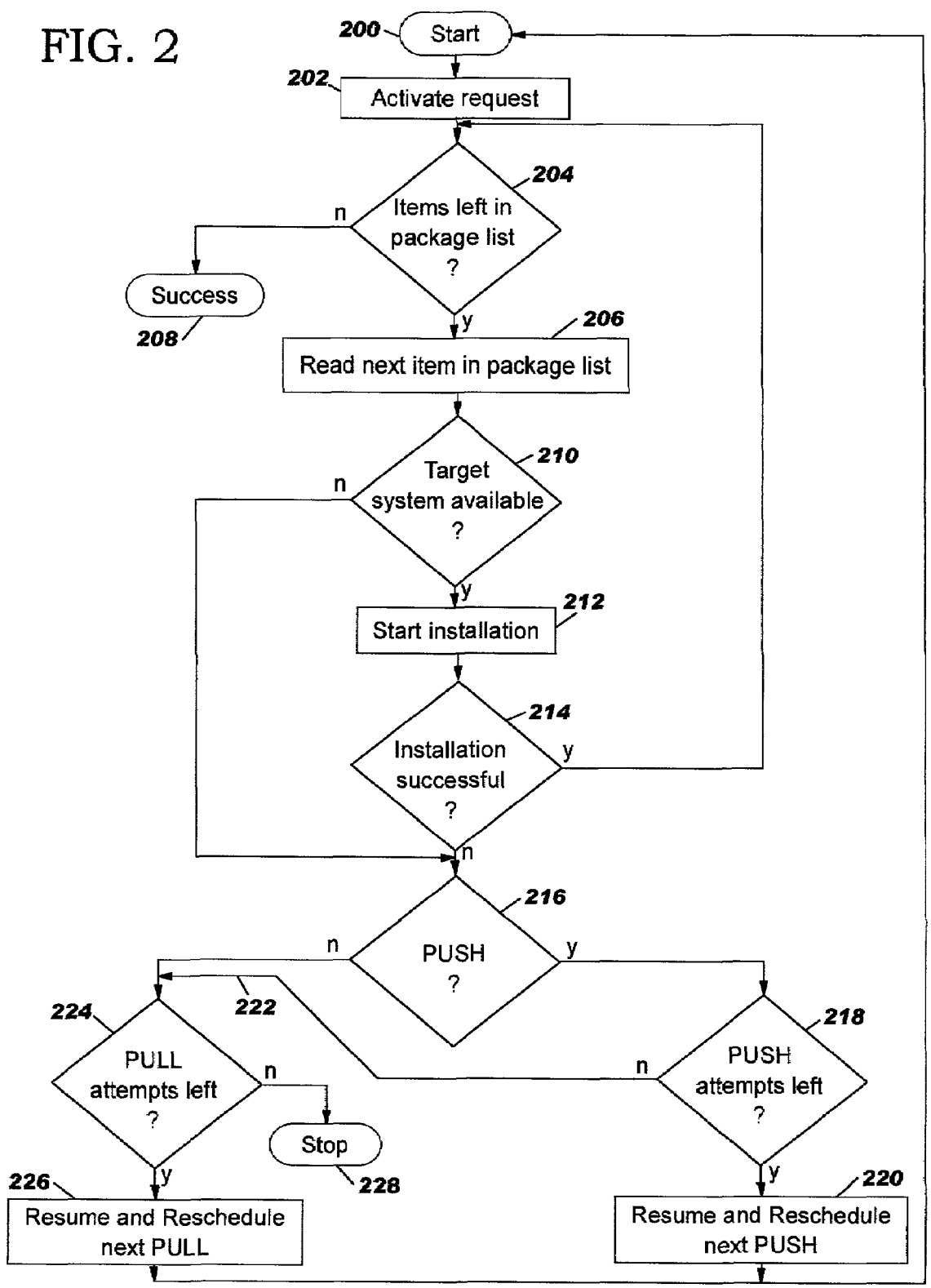
FIG. 2 is a more detailed flow diagram illustrating main steps of the SWD process of the invention.

FIG. 2 illustrates the basic steps performed by the predescribed main distribution script during a SWD process by way of a flow diagram. It is emphasized that these steps can be performed automatically.

Having started 200 the SWD process, the request queue is read and a first request being found will be set 202 into an active queue.

During the following steps, the package list for the particular request is worked off. At first it is checked 204, if any items are left in the package list. If at least one item is left, the item is read 206 as next item. If not, the process is successfully finished 208. Then it is checked 210, if a currently addressed EP (target system) is available, i.e. online and accessible. If available, the installation of the current item of the package list is started 212 on the EP. If the EP is not available, it is jumped to step 216 and a mode switching initiated, as described below. If the installation was successful 214, it is jumped back to step 204 where it is checked if a next item is left in the package list. If one item is left, the steps 206–212 described beforehand are executed again. If check 214 reveals that the installation was not successful, a mode switching is tried as described hereinbelow.

At first, it is checked 216 which mode flag is set. If the PUSH mode flag is set, it is further checked 218 if at least one PUSH attempt is left. It is noted hereby that the number of attempts is pre-specified. If a PUSH attempt is left, the distribution/installation is resumed and a next PUSH-mode distribution/installation rescheduled 220. If there is no PUSH attempt left, it is switched over 222 to the PULL-mode and further checked 224 if at least one PULL-mode attempt is left. If so, the installation is resumed and a next PULL-mode distribution/installation rescheduled 226. Otherwise, the process is finished 228.

It is emphasized that the above described switching over to the PULL-mode in case of no PUSH attempt being left forces the PULL-mode upon the target system and insofar is regareded as an 'Authoritative PULL-mode'.

Figure 3:
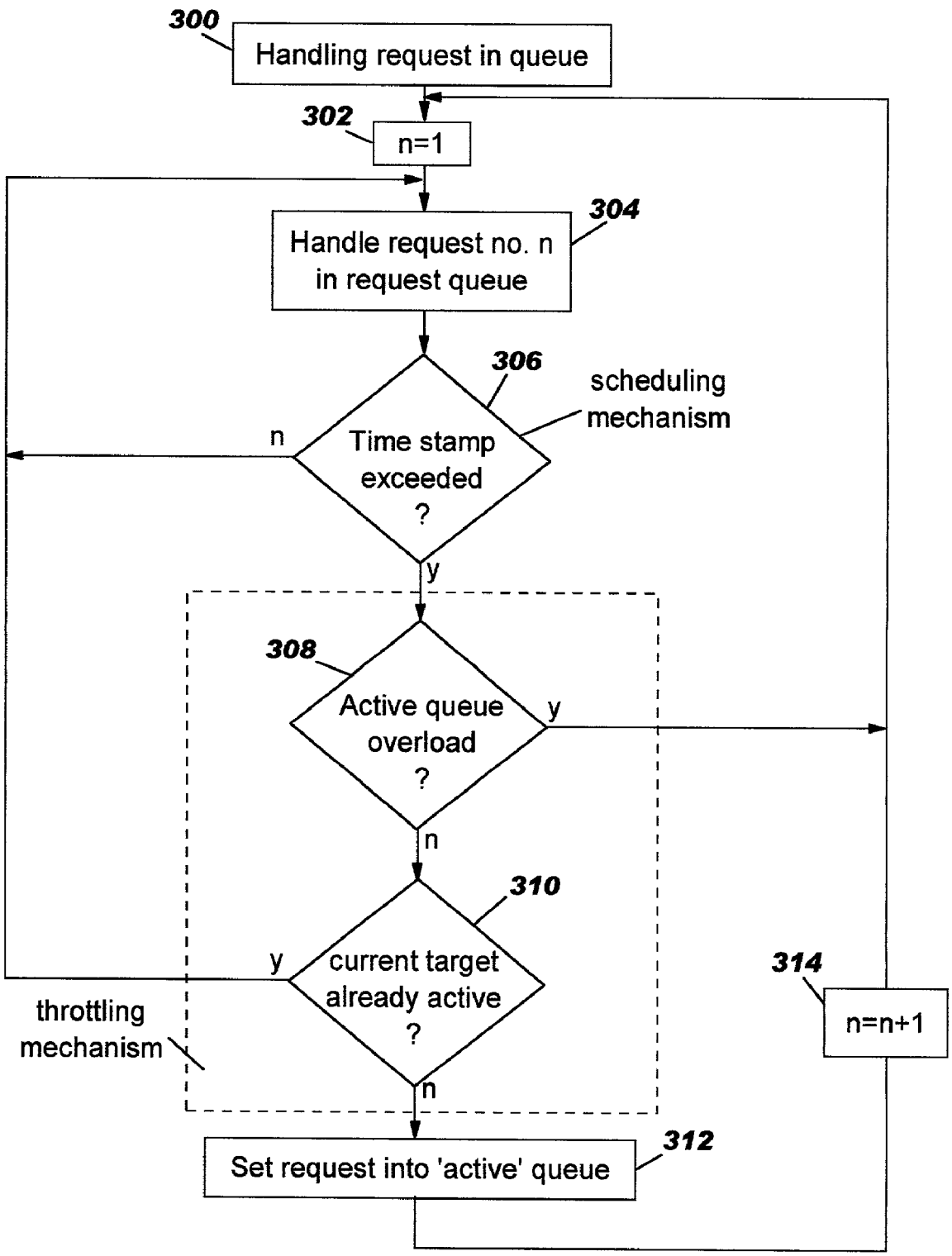
FIG. 3 is a flow diagram illustrating a queue manager mechanism proposed by the invention.

FIG. 3 illustrates a queue manager (QMGR) mechanism according to the invention by way of a flow diagram. First it is checked 300 if any requests are contained in the request queue. In the request queue, in the present embodiment requests are stored in an order determined e.g. by the time of creation of the request. That time determines the priority with which a request is processed. In the following it is assumed that the ordering is represented by numerals 1 to n. If the request queue contains at least one request 302, in the present example a request having assigned n=1, the request will be processed 304 by the queue manager. It is then checked 306 if a pre-specified time stamp (threshold) is exceeded. The latter check provides scheduling of the request processing, as being part of the QMGR. If the time stamp is not exceeded, it is jumped back to step 304 thus defining a wait state. If the time stamp is exceeded, it is next checked 308 if the active queue is currently overloaded. If so, it is jumped back to step 302. If there is no active queue overload, it is next checked 310 if the current target system is already active. If so, it is jumped back to step 304. Otherwise, the request is set into an active queue 312 and the next queue entry, if any, is prepared to be handled at 314. The steps 308 and 310 represent a throttling mechanism built in the QMGR, as indicated by the dotted line.

In addition, the SWD process can contain control and error handling features to make sure that a distribution process is started only when certain prerequisites are met.

Figure 4:
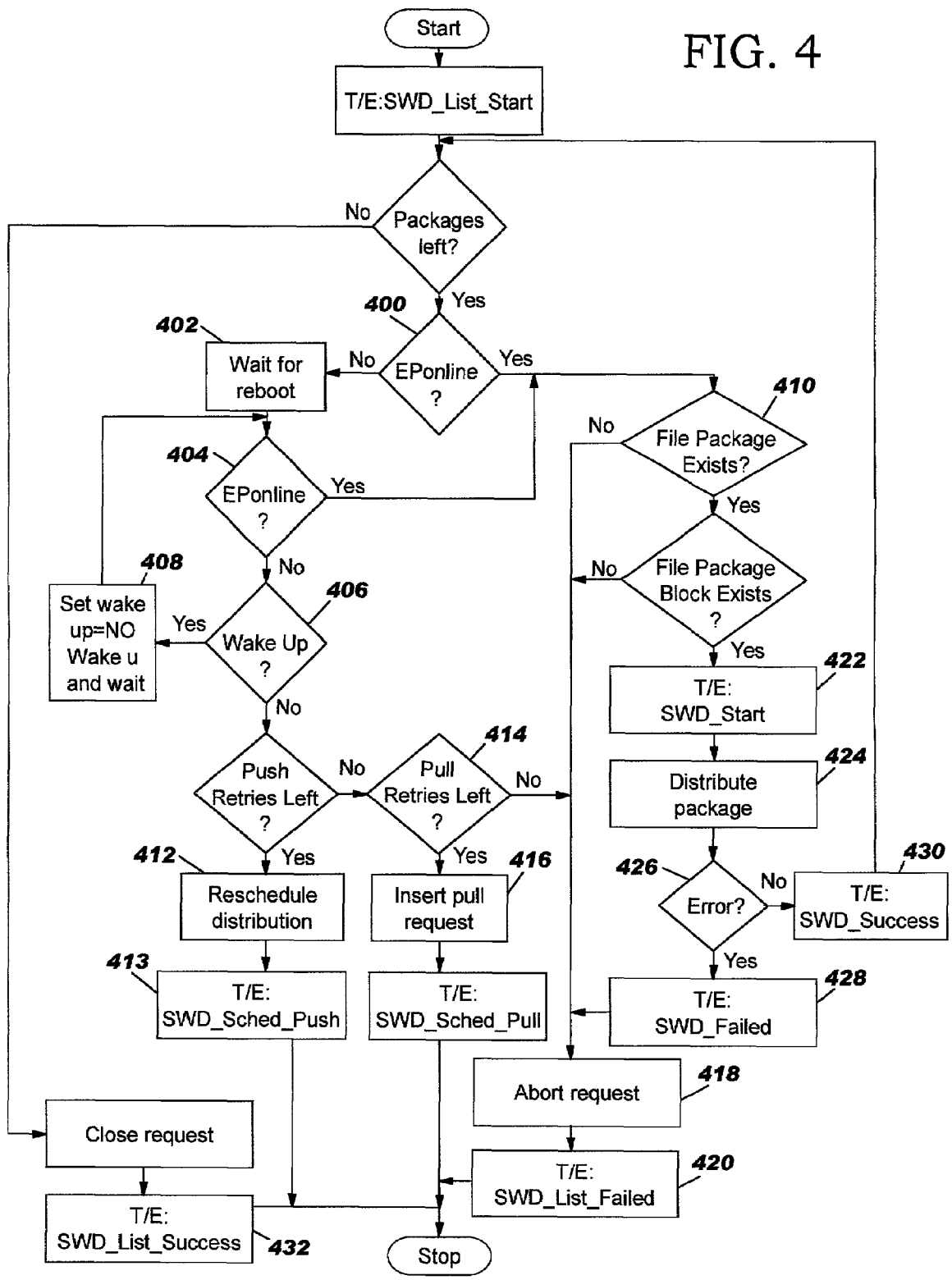
FIG. 4 is a flow diagram illustrating a preferred embodiment of the SWD process in more detail.

Now referring to FIG. 4, a preferred embodiment of the SWD process containing these features is described in more detail. One of the prerequesites is checking 400 an Endpoint Manager to determine if the Endpoint (the target computer) is online. If it is still not available after reboot at 402–404, any further action depends on the retry settings passed during the configuration and the retry status:

- If a Wake-On-LAN option 406 was selected during a request configuration, an external script will be called. This script has to be filled with action by the local administrator(s) due to possible differences in the way a wakeup action may be initiated. Again, after a boot delay period 408, the Endpoint status is again checked 404. If it is online now, the procedure switches to the next check 410. If not, reschedule options 412 explained in the following apply.
- If the number of push retries (attempts) is greater than 0, the request is moved into a hold queue. A distribution process is generated to re-insert 412 the request into the request queue. The process is automatically scheduled to a number of minutes in advance from the current time as configured in a 'Insert Distribution Request' process step. After this, a T/E message 413 is generated with severity WARNING stating that the distribution is rescheduled.
- If the number of push retries is equal 0 and the number of pull retries 414 is greater than 0, the request is moved into a pull queue 416. It will be restarted when the Endpoint logs in next time.
- If the number of push retries is equal 0 and the number of pull retries is equal 0, the request is moved into the abort queue 418, sending a T/E message 420 with severity MINOR, stating that a package list processing had failed and giving the last attempted file package in the message field.

After having passed all tests above, a T/E message of class SWD_Start 422 is sent and the distribution process is started by launching a 'wdistfpblock' call to distribute the current file package block on to the target 424. If this program 20 returns with a return code 426 other than '0', the distribution failed and the list processing will be cancelled. It should be noted that there is optionally a retry feature available if a distribution actually fails on an active Endpoint. Two T/E messages are sent, one of class SWD_Failed 428 with severity MINOR, stating that the current package distribution was not successful and one of class SWD_List_Failed 420 with severity MINOR, stating that a package list processing had failed and giving the last attempted file package in the message field. If the 'wdistfpblock' returns 0, a T/E message of class SWD_Success 430 is sent and the list processing continues with the next package. When all packages have been successfully distributed, the list processing ends with a T/E message of class SWD_List_Success 432 with severity HARMLESS and the request is moved into the done queue for reference.

During the processing, several T/E messages are generated, giving an operator the possibilty to easily monitor ongoing distributions. The start of the request list processing and the start of every single distribution is sent with severity WARNING to signal that there is some process in work. Each distribution and the list processing have a corresponding ending message, which generally closes the start event. When the process has been successful, the ending message is closed as well. Only the error condition remains in open status because in this case an operator action is mandatory. If there is no error, no message will be open after the list has been processed.

What is claimed is:

1. A method for remote distribution/installation of computer programs from a source data processing system to at least one target data processing system based on at least two distribution/installation modes, comprising:
   - checking if the at least one target data processing system is available;
   - performing distribution/installation according to one of the at least two distribution/installation modes, if the at least one target data processing system is available;
   - monitoring if the distribution/installation is successful;
   - switching the distribution/installation mode if the distribution/installation is not successful, wherein the computer programs are transferred as packages which are identified in a package list;
   - pre-specifying attempt numbers for retrying a push-mode distribution and a pull-mode distribution;
   - retrieving a next package identified in the package list; and
   - checking if the at least one target data processing system is available;
   - if the at least one target data processing system is available then starting installation of the package on the target data processing system;
   - otherwise, if at least one push-mode attempt is left, resuming and rescheduling a next push-mode distribution and, if no push-mode attempt is left, but at least one pull-mode attempt is left, resuming and rescheduling a next pull-mode distribution.

2. The method according to claim 1, wherein if the target data processing system is not available after several retries, performing the further particular steps of:
   - if the number of push retries is greater than 0, moving a distribution/installation request into a hold queue and scheduling re-insertion of the request into a request queue;
   - if the number of push retries is equal 0 and the number of pull retries is greater than 0, moving the request into a pull queue and restarting when the target computer system logs in; and if the number of push retries is equal 0 and the number of pull retries is equal 0, moving the request into an abort queue.

3. The method according to claim 2, further comprising queuing a distribution/installation request in a request queue and setting the distribution/installation request into an active queue when a pre-specified time is exceeded.

4. The method according to claim 2, further comprising detecting an active queue overload and checking if a currently selected target data processing system is already active.

5. A data processing program for execution in a data processing system comprising software code portions for performing a method according to claim 2 when said program is run on said computer.

6. A computer program product stored on a computer usable medium, comprising computer readable program means for causing a computer to perform a method according to claim 2 when said program is run on said computer.

7. The method according to claim 1, further comprising queuing a distribution/installation request in a request queue and setting the distribution/installation request into an active queue when a pre-specified time is exceeded.

8. The method according to claim 1, further comprising detecting an active queue overload and checking if a currently selected target data processing system is already active.

9. A data processing program for execution in a data processing system comprising software code portions for performing a method according to claim 1 when said program is run on said computer.

10. A computer program product stored on a computer usable medium, comprising computer readable program means for causing a computer to perform a method according to claim 1 when said program is run on said computer.

11. The method according to claim 1, further comprising queuing a distribution/installation request in a request queue and setting the distribution/installation request into an active queue when a pre-specified time is exceeded.

12. The method according to claim 1, further comprising detecting an active queue overload and checking if a currently selected target data processing system is already active.

* * * * *